United States Patent [19]

Masaki

[11] Patent Number: 4,901,298
[45] Date of Patent: Feb. 13, 1990

[54] TRACK PULSE CONTROLLED ADDRESS SEARCH METHOD FOR OPTICAL DISK PLAYER

[75] Inventor: Naoki Masaki, Saitama, Japan

[73] Assignee: Pioneer Electronic Corporation, Tokyo, Japan

[21] Appl. No.: 115,731

[22] Filed: Nov. 2, 1987

[30] Foreign Application Priority Data

Oct. 31, 1986 [JP] Japan .................. 61-260425

[51] Int. Cl.$^4$ ............................. G11B 7/085
[52] U.S. Cl. ...................... 369/32; 358/907; 360/78.04; 369/33; 369/45; 369/54
[58] Field of Search .................. 369/24, 30, 32, 33, 369/44–46, 53, 54; 360/78.01, 78.04, 38.1; 358/342, 907, 314, 336

[56] References Cited

U.S. PATENT DOCUMENTS

| | | | |
|---|---|---|---|
| 4,495,608 | 1/1985 | Kimura et al. | 369/33 |
| 4,562,562 | 12/1985 | Moriya et al. | 369/44 X |
| 4,627,038 | 12/1986 | Abed et al. | 369/30 X |
| 4,630,252 | 12/1986 | Miura et al. | 369/32 X |
| 4,669,075 | 5/1987 | Abe | 358/336 X |
| 4,674,076 | 6/1987 | Hsieh et al. | 369/33 X |
| 4,689,778 | 8/1987 | Miura et al. | 369/32 |
| 4,805,050 | 2/1989 | Aoyagi et al. | 369/32 X |
| 4,811,316 | 3/1989 | Hosoya | 369/32 |

Primary Examiner—Alan Faber
Assistant Examiner—W. R. Young
Attorney, Agent, or Firm—Sughrue, Mion, Zinn, Macpeak & Seas

[57] ABSTRACT

In an optical disk player including a focus servo system for forming a data detection light spot on a recording disk and a tracking servo system for producing a tracking error signal to control the position of the light spot relative to a recording track, an address search method is provided in which the movement of the light spot is controlled according to a track pulse formed according to the level of the tracking error signal. When it is determined that no track pulse has been produced for a predetermined period of time, the track jumping operation of the light spot is suspended and the abnormal condition of the focus servo system corrected. Track jumping can then be recommenced.

4 Claims, 3 Drawing Sheets

TRACK PULSE CONTROLLED ADDRESS SEARCH METHOD FOR OPTICAL DISK PLAYER

BACKGROUND OF THE INVENTION

The present invention relates to address search systems, and more particularly an address search system for an optical disk player.

An optical disk player is designed so that a light beam is applied to the data recording surface of a recording disk, and a pickup for detecting the recorded data using, for instance, the light beam reflected from the recording surface of the disk is employed to reproduce the data recorded on the disk. The disk player includes as essential components a focus servo device for controlling the position of the convergent point of the light beam emitted from the pickup to form a data detecting light spot on the data recording surface of the disk and a tracking servo device for causing the light spot to follow the spiral recording track formed on the recording surface of the disk.

For the optical recording disk player, an address search system has been proposed in which the present address is compared with a target address, and the data detecting light spot is caused to jump a distance determined according to the difference between the two addresses. A track jumping operation is repeatedly carried out until the target address is reached. In this system, the distance of movement of the light spot in the track jumping operation is detected according to a track pulse formed according to the level of the error signal of the tracking servo device. In this arrangement, if the focus servo control is disrupted, for example, due to scratches on the disk or an external impact, the level of the tracking error signal is decreased and no track pulse is produced.

Accordingly, the conventional address search system is disadvantageous in that the distance of movement of the light spot in the track jumping operation is often detected with error, as a result of which the light spot is positioned away from the target address. At the worst, it can even be moved out of the signal area of the disk. That is, overrun or runaway of the pickup can be caused, resulting in a decrease in access speed, search error, or the suspension of the data reproducing operation.

SUMMARY OF THE INVENTION

Accordingly, an object of this invention is to eliminate the above-described difficulties accompanying a conventional address search system.

More specifically, an object of the invention is to provide an address search system for an optical disk player in which overrun or runaway of the pickup is prevented even when control of the focus servo device becomes irregular.

The foregoing object and other objects of the invention have been achieved by the provision of an address search method for an optical disk player including focus servo means for controlling the position of the convergent point of a light beam emitted from a light source to form a data detecting light spot on the recording surface of a recording disk, and tracking servo means for providing a tracking error signal corresponding to a position of the data detecting light spot relative to a recording track according to the light beam reflected from the recording surface. The tracking error signal is applied to control the relative position of the data detecting light spot. The distance of movement of the data detecting light spot in a track jumping operation is controlled according to a track pulse formed according to the level of the tracking error signal, and, according to the invention, a determination is made as to whether or not the track pulse has been produced for a predetermined period of time. When it is determined that no track pulse has been produced during the predetermined period of time, the track jumping operation is suspended and then started again after the abnormal condition of the focus servo means has been detected and corrected.

The nature, principle and utility of the invention will become more apparent from the following detailed description when read in conjunction with the accompanying drawings.

DESCRIPTION OF THE PREFERRED EMBODIMENTS

An example of an address search method according to this invention will be described with reference to the accompanying drawings.

Figure 1:
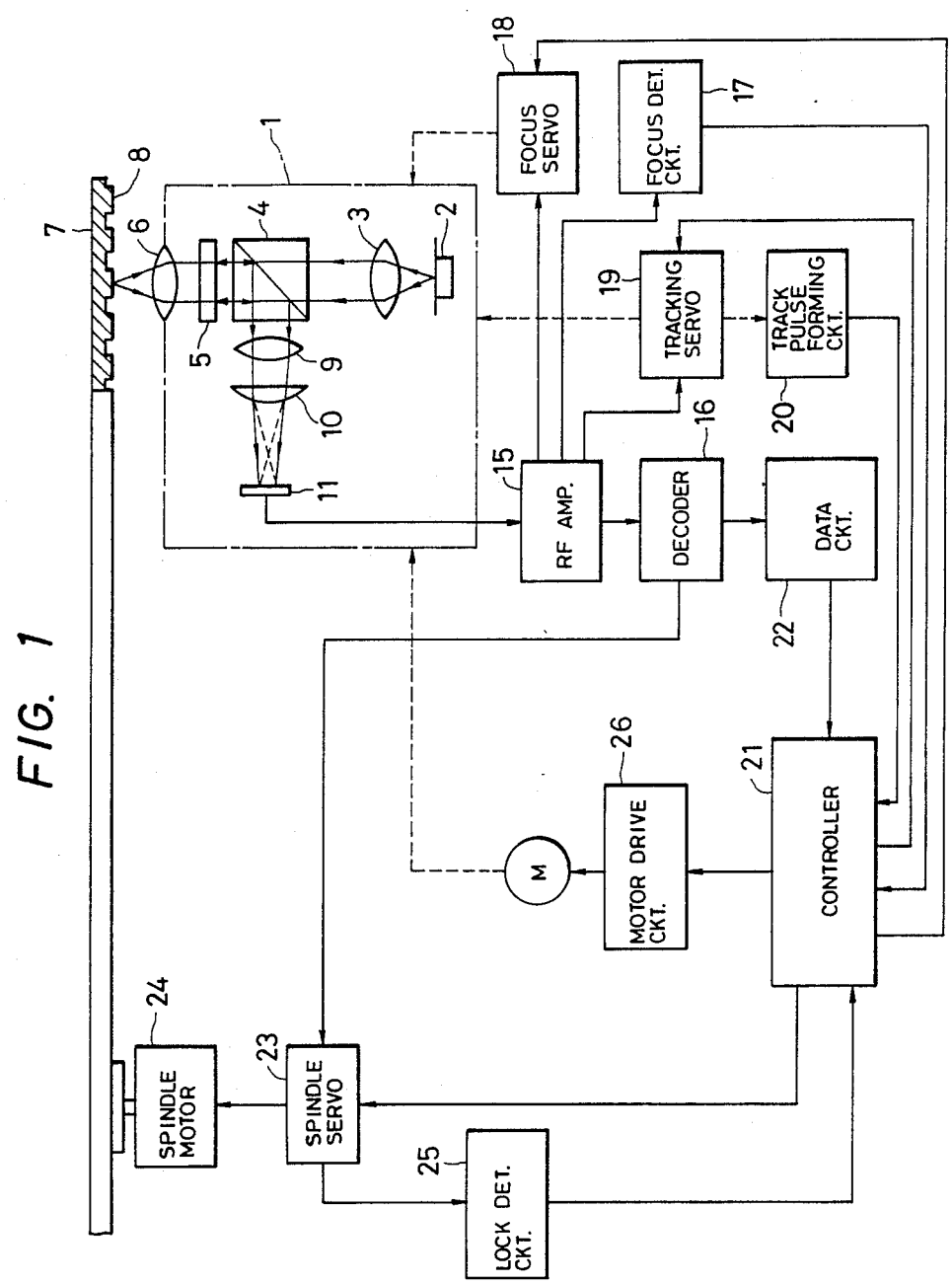
FIG. 1 is a block diagram showing an example of an optical recording disk player to which an address search method according to the invention is applied.

As shown in FIG. 1, a laser beam emitted by a laser beam source 2 such as a laser diode in a pickup 1 is converted into a parallel light beam by a collimator lens 3. The parallel light beam, after passing through a beam splitter 4, a quarter-wave plate 5 for changing the direction of polarization, and an objective lens 6, is focused on a recording disk 7; that is, a data detecting light spot is formed. Recording tracks (pits) 8 are formed on the recording surface of the recording disk 7. The light beam reflected from the recording surface of the disk 7, after passing through the objective lens 6 and the quarter wave plate 5, is applied to the beam splitter 4, where the reflected light beam, which carries the data, is separated from the incident light beam. The reflected light beam thus separated is applied through a convex lens 9 and a cylindrical lens 10 to a four-section detector 11. The detector 11 is arranged so that its light receiving surface is at the position where the reflected light beam passed through the cylindrical lens 10 is circular in section.

The outputs of the four-section detector 11 are applied to an RF amplifier, where the sum signal of the detector 11 is formed. The sum signal is supplied as an RF signal to a decoder circuit 16 and a focus detecting circuit 17. Also, the outputs of the four-section detector 11 amplified by the RF amplifier 15 are applied to a focus servo circuit 18 and a tracking servo circuit 19.

Figure 2:
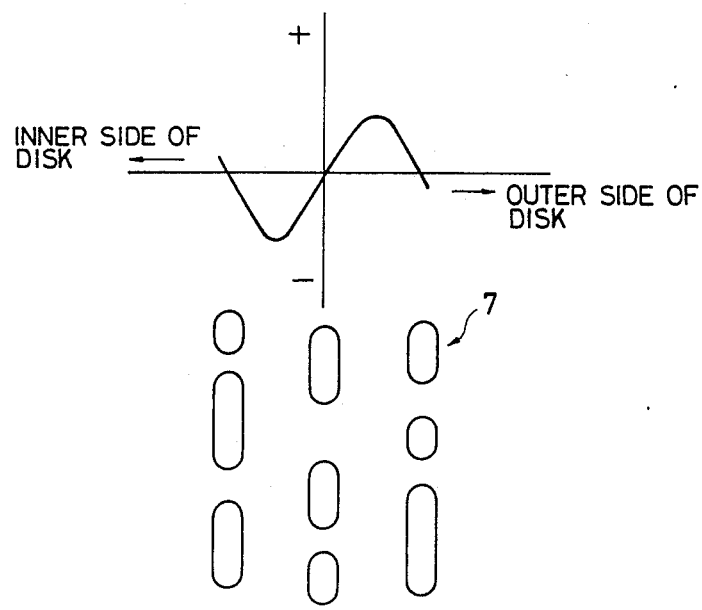
FIG. 2 is an explanatory diagram showing the relationship between a tracking error signal and recording tracks.

In the focus servo circuit 18, a focus error signal corresponding to the direction and amount of shift of the convergent point of the laser beam outputted by the pickup 1 is formed according to the astigmatism method. The focus error signal thus formed operates a focus actuator (not shown) adapted to displace the objective lens of the pickup 1 in the optical axis direction. In the tracking servo circuit 19, a tracking error signal corresponding to the direction and amount of shift of the data detecting light spot from the recording track is formed according, for instance, to the push-pull method. The tracking error signal has a so-called S-shaped characteristic which, as shown in FIG. 2, crosses the zero level when the detecting light spot coincides with the central axis of a recording track 8. The tracking error signal is used to drive a tracking actuator (not shown) adapted to displace the objective lens 6 of the pickup 1 in a direction perpendicular to the optical axis.

The tracking error signal is further applied to a track pulse forming circuit 20. In the circuit 20, when the pickup 1 is moved radially on the disk, a track pulse is formed whenever the data detecting light spot crosses the recording track 8 as indicated by the tracking error signal shown in FIG. 2. The track pulse thus produced is applied to a controller 21.

The focusing detecting circuit 17 outputs a focusing detection signal when, for instance, the level of the RF signal reaches a certain value. The detection output of the circuit 17 is applied to the controller 21.

The decoder circuit 16 may, for instance, be composed of an EFM (eight-to-fourteen modulation) demodulation circuit. In the decoder circuit, a synchronizing signal is detected from a pulse train signal obtained by shaping the RF signal, and the synchronizing signal thus detected is used for decoding the data. The decoded data is supplied to a data extracting circuit 22, where the data are divided into control data indicating music intervals, inter-music intervals, music selection numbers, play (performance) times and addresses, and audio data. The synchronizing signal detected by the decoder circuit 16 is utilized to form a timing signal, which is applied to a spindle servo circuit 23.

In the spindle servo circuit 23, a spindle error signal is formed according to the phase difference between the timing signal and a reference signal. The spindle error signal thus produced is used to drive a spindle motor 24 driving the disk 7. The spindle error signal is further applied to a lock detecting circuit 25. The circuit 25 outputs a lock detection signal when the level of the spindle error is in a predetermined range. The lock detection signal is applied to the controller 21.

The audio data separated by the data extracting circuit 22 is converted to an audio output by a D/A (digital-to-analog) converter (not shown). The control data is supplied to the controller 21. The controller 21 further receives an address search instruction and data indicating a target address from an operating section (not shown). The controller may be implemented with at least one microcomputer including a processor, a ROM (read-only-memory) and an interface circuit. In the controller 21, the processor operates according to a program, which is provided according to the flowchart of FIG. 3 and stored in the ROM in advance, to supply various instructions to the focus servo circuit 18, the tracking servo circuit 19, the spindle servo circuit 23, and the motor drive circuit 26. The motor drive circuit 26, in response to the instruction, supplies a drive current to a motor M which moves a slider (not shown) radially of the disk. The slider supports the pickup 1.

Figure 3:
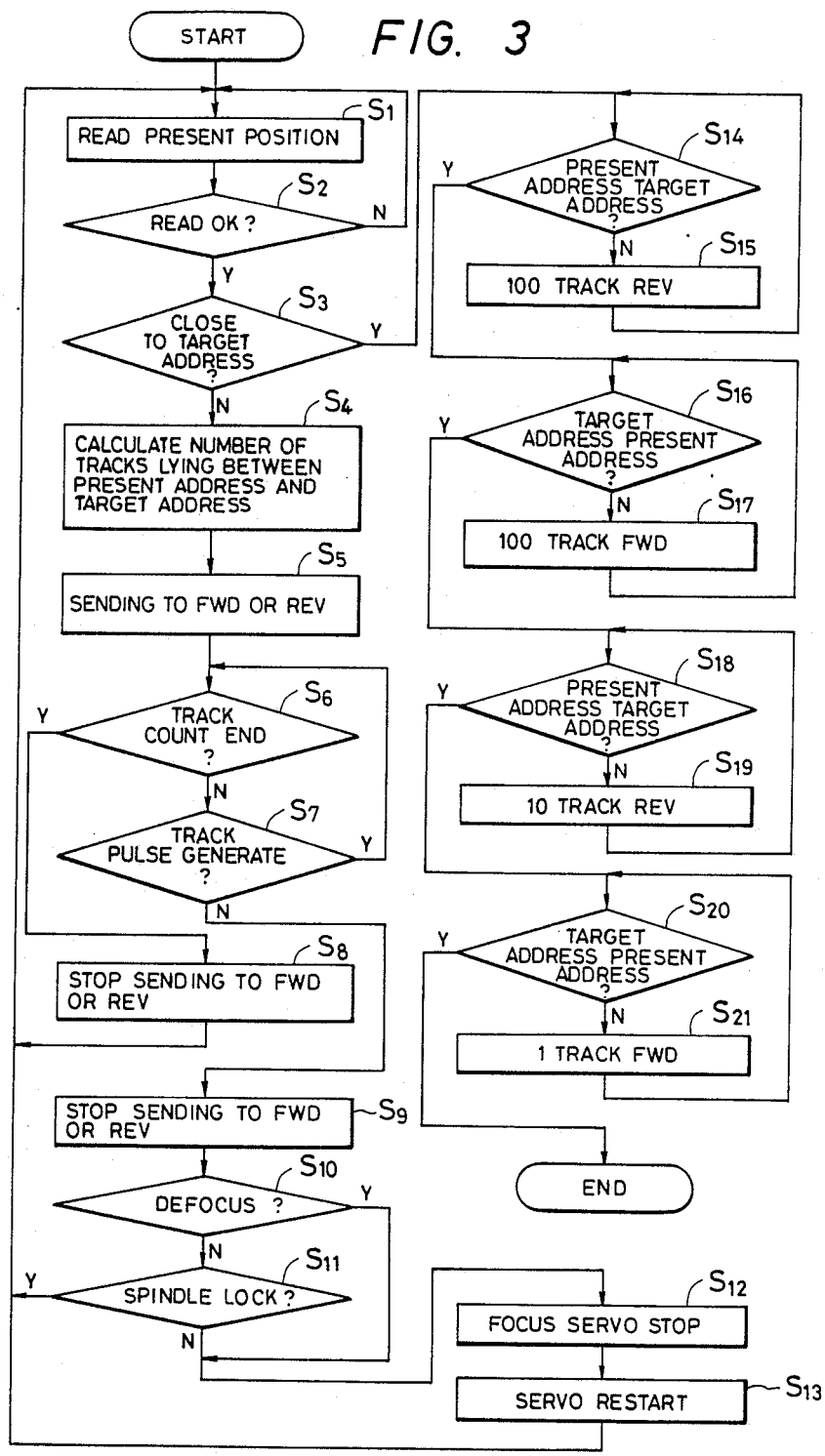
FIG. 3 is a flowchart showing the operating steps of the address search method according to the invention.

The operation of the processor in the controller 21 will be described with reference to the flowchart of FIG. 3 and with reference to the sequence diagram of FIG. 4.

Data is provided indicating the absolute period of time required for the pickup to move from the innermost periphery of the disk to the present position and data is also provided indicating the absolute periods of time required for the pickup to move from the innermost periphery of the disk to the start points of the various pieces of music are recorded in the disk, which may be a so-called compact disk.

Figure 4:
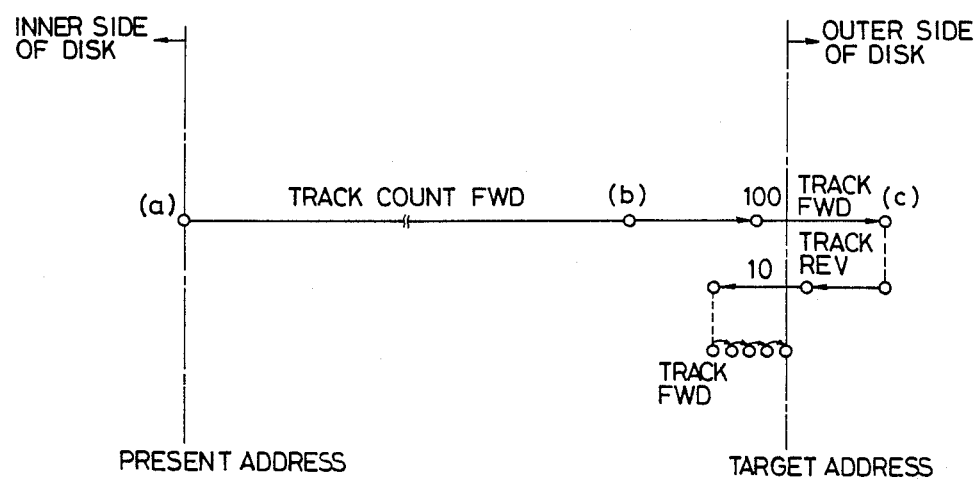
FIG. 4 is a sequence diagram showing a search operation according to the address search method of the invention.

It is assumed that, when the data detecting point, namely, the light spot of the pickup 1, is at the point (a) in FIG. 4, an address search instruction is issued. In this case, the processor carries out a present address reading operation according to address data extracted by the data extracting circuit 22 (FIG. 1) (step $S_1$). In the processor, the present address is read and compared with a target address (steps $S_2$ and $S_3$). When it is determined that the distance between the two addresses is larger than a predetermined value, i.e., the target address is far, the number of tracks lying between the present address and the target address is calculated (step $S_4$). The calculation of the number of tracks is carried out according to the absolute times of the addresses, the speed of rotation of the disk, and the track pitch.

Thereafter, the processor sets the number of tracks N thus calculated as the number of tracks N' to be counted, and then moves the pickup 1 towards the target address, i.e., in the direction FWD in FIG. 4 (step $S_5$). In the case where it is determined that the number of tracks N is larger than a certain value n, the value obtained by subtracting a predetermined value m, from the number N may be set as the number of tracks N' to be counted. This subtraction operation prevents the light spot from the pickup 1 from moving significantly past the target address because of computation errors in the number of tracks or overshooting in the feeding operation when the pickup 1 is moved. Instead of subtracting the predetermined value m from the number of tracks N, the number of tracks N may be multiplied by a predetermined value l smaller than unity ($l < 1$).

The processor, while moving the pickup 1, counts the track pulses produced by the track pulse forming circuit 20 (FIG. 1). When it is determined that the count value has reached the number of tracks N' (step $S_6$), the processor stops the movement of the pickup 1 (step $S_8$). Thus, the light spot reaches the point (b) in FIG. 4.

The processor reads the present address at the point (b) and compares it with the target address (steps $S_1$ through $S_3$). When the distance between the two address is equal to the predetermined value or less, step $S_{14}$ is effected in which the present address is compared with the target address. When it is determined that the present address is larger than the target address in step $S_{14}$, Step $S_{15}$ is effected. In step $S_{15}$, the processor carries out a 100-track jump in which the light spot is caused to jump a distance corresponding to 100 tracks in the direction REV. In the case of FIG. 4, the present address is smaller than the target address, and therefore step $S_{14}$ is switched over to step $S_{17}$ through step $S_{16}$. In step $S_{17}$, the processor carries out a 100-track jump in the direction FWD. The processor repeatedly carries out 100-track jumps in the direction FWD until in step $S_{16}$ it is determined that the present address is larger than the target address. Thus, the light spot reaches the point (c).

In succession, the processor repeatedly carries out 10-track jumps in the direction REV until the present address passes the target address (Steps $S_{18}$ and $S_{19}$). In the case where the present address passes the target address with a 10-track jump, the processor carries out a one-track jump in the direction FWD until the present address coincides with or again passes the target address (steps $S_{20}$ and $S_{21}$). That is, after the light spot has reached the point (b), the processor gradually decreases the jump distance according to the results of the comparison between the present address and the target address, thereby to converge the position of the light spot of the pickup 1 on the target address.

When the light spot of the pickup 1 jumps recording tracks, sometimes no track pulse is generated due, for example, to scratches formed on the recording disk or an external impact whereby the light beam is defocused or the level of the RF signal is decreased for a short period of time. In this case, since the level of the RF signal is decreased, the focusing detecting circuit 17 provides no focusing detection signal. When the focusing detection signal is not outputted for a predetermined period of time, the processor determines in step $S_7$ that no track pulse has been produced. As a result, step $S_9$ is effected so that the movement of the pickup 1 is stopped. Thereafter, in step $S_{10}$ it is determined from the focusing detection signal whether or not the light beam is defocused. If it is determined that defocusing has occurred, step $S_{12}$ is effected. In Step $S_{12}$, the processor suspends the control of the focus servo circuit 18, the tracking servo circuit 19, and the spindle servo circuit 23. Thereafter, the processor starts the control of these servo circuits (step $S_{13}$), and step $S_1$ is effected to start the search operation again.

In the case when, in the above-described operation, defocusing occurs, the jumping operation is stopped and then the focus servo unit is started again to start the search operation again. This prevents overrun or runaway of the pickup.

When in step $S_{10}$ it is determined that defocusing has not been caused, step $S_{11}$ is effected. In step $S_{11}$, the processor determines whether or not the spindle servo circuit 23 is locked. If, in step $S_{11}$, it is determined that the spindle servo circuit 23 is locked, step $S_1$ is effected so that the search operation is started again. When in step $S_{11}$ it is determined that the spindle servo circuit 23 is not locked, step $S_{12}$ is effected. In step $S_{12}$, similar to the case where defocusing occurs, the processor suspends the operation of all servo circuits. Thereafter, the servo circuits are started again, and the search operation started anew.

Thus, in the case when the level of the RF signal decreases temporarily, the jumping operation is suspended, and after it has been confirmed that the various servo systems, for instance, the focus servo system, are operating satisfactorily, the search operation is conducted again. This action positively prevents overrun or the like of the pickup.

In the above-described embodiment, it is determined from the output of the focusing detecting circuit 17 whether or not the track pulse is produced. However, for example, loss of the track pulse can be sensed by directly determining when no track pulse has been outputted for a predetermined period of time.

As described above, in the address search system of the invention, it is determined whether or not the track pulse has been produced for a predetermined period of time during the track jumping operation, and when it is detected that no track pulse has been produced for the predetermined period of time, the track jumping operation is suspended then started again after the abnormal conditions of the focus servo systems have been detected and corrected. Therefore, the system of the invention prevents overrun or the like of the pickup, even when no track pulse is produced.

What is claimed is:

1. In a recording disk player comprising focus servo means for controlling the position of the convergent point of a light beam emitted from a light source to form a data detecting light spot on the reflective recording surface of a recording disk, and tracking servo means for providing a tracking error signal corresponding to a position of said data detecting light spot relative to a recording track in response to said light beam reflected from said recording surface to control said relative position of said data detecting light spot, an address search method in which the distance of movement of said data detecting light spot in a track jumping operation is controlled in response to a track pulse formed according to a level of said tracking error signal, comprising the steps of: in said track jumping operation, determining whether or not said track pulse has been produced for a predetermined period of time, and when it is determined that no track pulse has been produced for said predetermined period of time, suspending said track jumping operation, subjecting said focus servo means to abnormal condition detection and correction, then starting said track jumping operation again.

2. The address search method of claim 1, wherein said step of determining whether or not said track pulse has been produced comprises sensing a level of a focus detection signal produced by a focus detecting means.

3. The address search method of claim 1, wherein said step of determining whether or not said track pulse has been produced comprises directly sensing a presence of said track pulse.

4. The address search method of claim 1, further comprising the step of suspending the operations of all servo systems controlling said beam when it is determined that no track pulse has been produced for said predetermined period of time.

* * * * *